(12) United States Patent
Rashid et al.

(10) Patent No.: US 9,243,102 B2
(45) Date of Patent: Jan. 26, 2016

(54) POLYMERS FOR CONTACT LENSES

(75) Inventors: Abdul Rashid, Bellshill (GB); Roderick William Jonathan Bowers, Bellshill (GB); Wade Tipton, Bellshill (GB); Neil Bonnette Graham, Bellshill (GB)

(73) Assignee: OCUTEC LIMITED, Bellshill (GB)

( * ) Notice: Subject to any disclaimer, the term of this patent is extended or adjusted under 35 U.S.C. 154(b) by 768 days.

(21) Appl. No.: 13/505,418

(22) PCT Filed: Nov. 2, 2010

(86) PCT No.: PCT/GB2010/002026
§ 371 (c)(1),
(2), (4) Date: Aug. 10, 2012

(87) PCT Pub. No.: WO2011/055110
PCT Pub. Date: May 12, 2011

(65) Prior Publication Data
US 2012/0302656 A1    Nov. 29, 2012

(30) Foreign Application Priority Data

Nov. 5, 2009  (GB) .................................. 0919411.9

(51) Int. Cl.
*G02B 1/04*     (2006.01)
*C08G 18/48*    (2006.01)
*C08G 18/66*    (2006.01)

(52) U.S. Cl.
CPC ........ *C08G 18/4833* (2013.01); *C08G 18/6674* (2013.01); *G02B 1/043* (2013.01); *C08G 2220/00* (2013.01)

(58) Field of Classification Search
CPC .... G02B 1/043; C08L 75/08; C08G 18/4833; C08G 18/6674
USPC ....................................................... 523/107
See application file for complete search history.

(56) References Cited

U.S. PATENT DOCUMENTS

| 3,939,123 | A |   | 2/1976  | Matthews et al. |
|-----------|---|---|---------|-----------------|
| 4,485,227 | A |   | 11/1984 | Fox |
| 4,644,033 | A |   | 2/1987  | Gnanou et al. ................... 524/50 |
| 4,780,512 | A |   | 10/1988 | Gould et al. |
| 4,810,582 | A | * | 3/1989  | Gould et al. ............... 428/423.1 |
| 4,886,700 | A |   | 12/1989 | Younes |
| 4,886,866 | A |   | 12/1989 | Braatz et al. ................... 528/159 |
| 4,929,706 | A |   | 5/1990  | Heifetz et al. |
| 5,039,458 | A | * | 8/1991  | Braatz et al. .................... 264/2.6 |
| 5,120,816 | A | * | 6/1992  | Gould et al. ..................... 528/76 |
| 6,012,471 | A |   | 1/2000  | Calvin et al. |
| 6,673,273 | B2 |  | 1/2004  | Ba Le et al. |
| 6,930,196 | B2 |  | 8/2005  | Carlson |
| 6,995,192 | B2 |  | 2/2006  | Phelan et al. .................... 522/90 |
| 9,000,065 | B2 | * | 4/2015 | Rashid et al. .................. 523/107 |
| 2002/0032297 | A1 | * | 3/2002 | Carlson et al. ................... 528/44 |
| 2003/0069383 | A1 |   | 4/2003 | Van Antwerp et al. |
| 2004/0018300 | A1 |   | 1/2004 | Baillet et al. .................. 427/162 |
| 2005/0095276 | A1 | * | 5/2005 | Kartheus et al. .............. 424/448 |
| 2006/0006558 | A1 |   | 1/2006 | Yamada |
| 2007/0105973 | A1 |   | 5/2007 | Nicolson et al. |
| 2007/0296094 | A1 |   | 12/2007 | Jiang et al. |
| 2009/0010986 | A1 |   | 1/2009 | Ashton et al. ................. 424/422 |

FOREIGN PATENT DOCUMENTS

| DE | 10 2008 023798 A1 | 11/2009 |
|----|-------------------|---------|
| EP | 0117768 B1 | 12/1986 |
| EP | 0350890 A2 | 1/1990 |
| EP | 2270551 A2 | 1/2011 |
| FR | 2674529 A1 | 10/1992 |
| WO | 01/24839 A1 | 4/2001 |
| WO | 02/00749 A2 | 1/2002 |
| WO | 02/081183 A | 10/2002 |
| WO | 2004/020495 | 3/2004 |
| WO | 2006/010612 A1 | 2/2006 |
| WO | 2006/064085 A2 | 6/2006 |

* cited by examiner

*Primary Examiner* — Michael Pepitone
(74) *Attorney, Agent, or Firm* — Foley & Lardner LLP

(57) ABSTRACT

The present invention relates to a thermoplastic polyurethane contact lens prepared from a mixture comprising: (a) at least one polyethylene glycol; (b) at least one di-isocyanate; and (c) at least one diol of formula (I): wherein n is an integer from 1 to 25; wherein the polyethylene glycol, di-isocyanate and diol are reacted under substantially anhydrous conditions. Further aspects of the invention relate to a process for preparing a contact lens. The invention also relates to a process for preparing a polyurethane xerogel in the form of a molded article, said process comprising the steps of: (i) preparing a reaction mixture comprising at least one polyethylene glycol, at least one di-isocyanate and at least one diol of formula I as described above; (ii) reacting the reaction mixture formed in step (i) under substantially anhydrous conditions to form a polyurethane xerogel; (iii) injection molding the polyurethane xerogel to form a molded article, (iv) hydrating the xerogel molded article to form a contact lens.

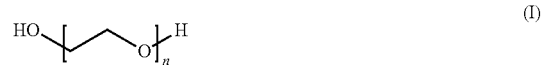

(I)

3 Claims, No Drawings

POLYMERS FOR CONTACT LENSES

CROSS REFERENCE TO RELATED APPLICATIONS

This application is a U.S. national phase application under 35 U.S.C. §371 of International Application No. PCT/GB2010/002026, filed on Nov. 2, 2010, which claims priority to and the benefit of United Kingdom Patent Application No. 0919411.9 filed on Nov. 5, 2009. The entire disclosures of each of the above-identified patent applications are incorporated by reference herein.

The present invention relates to PEG based thermoplastic polyurethane polymers that have applications in the field of contact lens technology. The invention also relates to a process for preparing such materials.

BACKGROUND TO THE INVENTION

Soft contact lenses offer a viable alternative to spectacles for the correction of visual defects such as myopia, hypermetropia and astigmatism. Early lenses were manufactured from polymers based on 2-hydroxyethyl methacrylate, (HEMA). Although these lenses provided some comfort but did not provide sufficient oxygen permeability to prevent problems associated with corneal hypoxia. Attempts to address this problem included copolymerising HEMA with hydrophilic monomers such as methacrylic acid and N-vinyl pyrrolidone. Although these polymers increased the level of oxygen permeability, the incorporation of these comonomers also leads to problems such as protein and lipid deposition, corneal desiccation, staining and lens dehydration.

More recently, a new generation of polymers has been developed to further increase the level of oxygen. These materials are based on the copolymerisation of silicone methacylates with hydrophilic comonomers. The lenses produced from these materials were originally designed for extended wear. Though daily wear products also exist now. Although successful in further increasing DK, these new materials still suffer from limitations such as lipid binding and dryness, all of which decrease lens on eye comfort.

There is therefore still a need for new contact lens polymers, which offer sufficient oxygen levels for normal corneal metabolism during daily wear, and which provide a high level of comfort throughout the day.

One class of polymers which holds considerable promise for novel contact lens materials are PEG based polyurethanes.

Urethane chemistries have also been widely investigated in the field of biomedical devices. For example, U.S. Pat. No. 3,786,034 discloses hard, hydrophilic polyurethane materials formed from reacting a specific polyol with a polyfunctional isocyanate. U.S. Pat. No. 3,821,186 teaches similar such materials. Likewise, U.S. Pat. No. 4,136,250 teaches a polymer formed by reacting a high molecular weight polydimethyl siloxane diol with 2 mole equivalents of isophorone di-isocyanate and then reacting with excess hydroxyl-containing monomers. Further urethane copolymers are disclosed in U.S. Pat. Nos. 4,454,309 and 4,359,553.

U.S. Pat. No. 6,930,196 discloses polyurethane hydrogel contact lenses prepared from prepolymers made by reacting (a) at least one multifunctional compound; (b) at least one di-isocyanate; and (c) at least one diol. The prepolymers so formed are then reacted with excess water to form a hydrogel polymer suitable for use as a contact lens.

U.S. Pat. No. 4,644,033 discloses a polyurethane hydrogel formed from the reaction of a polyoxyethylene and a polyfunctional isocyanate in a non-aqueous solvent. The materials can be molded into contact lenses.

U.S. Pat. No. 5,932,200 discloses a polyurethane formed from reacting a diol component and an organic di-isocyanate with critical selection of the amount of water in the reaction mixture and the diol component. The polyurethane is in the form of a gel that has applications in burn/wound care dressings and as surgical implants.

U.S. Pat. Nos. 4,885,966 and 5,175,229 disclose hydrophilic polymeric soft contact lenses prepared from prepolymers that are isocyanate-capped oxyethylene-based diols or polyols having a molecular weight of about 7000 to 30,000, wherein essentially all of the OH groups are capped with polyisocyanate. The prepolymers are hydrated to form polyurea-polyurethane polymers that are characterised by having a non-ionic surface which is resistant to non-specific protein adsorption.

U.S. Pat. No. 4,989,710 discloses linear polymers comprising polyurethane/urea polyethylene glycol combined with units of polypropylene glycol. The presence of polypropylene glycol leads to a higher modulus and tensile strength.

U.S. Pat. No. 5,563,233 discloses a hydrophilic polyether polyurethane polymer which is the reaction product of a polyoxyalkylene glycol, a glycol and an organic di-isocyanate. Similarly, U.S. Pat. Nos. 5,932,200 and 5,120,816 discloses contact lenses made from hydrogels derived from the reaction product of polyethylene glycols and di-isocyanates. Urea groups are introduced into the backbone by incorporating qualitatively measured amounts of water into the reaction mixture. In each case, the presence of water leads to the formation of urea groups in the backbone chain which in turn gives rise to increased modulus values that are undesirable in the contact lens industry.

The present invention seeks to provide new polyurethane-based materials that are suitable for use in the contact lens industry. The polyurethane-based materials of the invention are thermoplastic copolymers that exhibit exemplary physical properties, for example, in terms of modulus, oxygen permeability, light transmissibility, surface wettability and wearer comfort over extended periods. Advantageously, the thermoplastic materials described herein are suitable for use in conventional injection molding apparatus, thereby enabling high throughput production of contact lenses.

STATEMENT OF INVENTION

A first aspect of the invention relates to a polyurethane xerogel prepared from a mixture comprising:
(a) at least one polyethylene glycol;
(b) at least one di-isocyanate; and
(c) at least one diol of formula I,

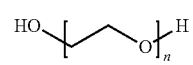

wherein n is an integer from 1 to 25, preferably 2 to 10, more preferably 2 to 4;
wherein the polyethylene glycol, di-isocyanate and diol are reacted under substantially anhydrous conditions.

Typically the polyurethane xerogel is in the form of a contact lens.

Advantageously, the present invention involves reacting the reactants under substantially anhydrous conditions to form a polyurethane xerogel, i.e. without the addition of water as a reactant, in contrast to methods known in the art in which water is deliberately incorporated as a reactant. The incorporation of urea groups (resulting from the presence of water in the reaction mixture) increases the modulus value of the material, which is undesirable in materials for use in the contact lens industry. Advantageously, the present invention substantially excludes water from the reaction mixture, thereby minimising the formation of urea groups in the polymer backbone and giving rise to materials having lower, more desirable modulus values. The presently claimed materials are thermoplastic polymers that are suitable for injection and compression molding. The materials are also suitable for cast molding, in the same way as traditional non-thermoplastic materials are cast molded to make contact lenses.

A second aspect of the invention relates to a polyurethane hydrogel which comprises the polyurethane xerogel as described above in hydrated form. Typically the polyurethane hydrogel is in the form of a contact lens.

A third aspect of the invention relates to a process for preparing a polyurethane xerogel contact lens, said process comprising:
(i) preparing a mixture comprising at least one polyethylene glycol, at least one di-isocyanate and at least one diol of formula I

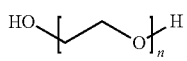

I wherein n is an integer from 1 to 25, preferably 2 to 10, more preferably 2 to 4;
(ii) reacting the mixture formed in step (i) under substantially anhydrous conditions to form a polyurethane xerogel; and
(iii) processing the polyurethane xerogel to form a contact lens.

A fourth aspect of the invention relates to a polyurethane xerogel contact lens obtainable by the above process.

A fifth aspect of the invention relates to a process for preparing a polyurethane hydrogel contact lens, said process comprising preparing a polyurethane xerogel contact lens as described above, and hydrating said polyurethane xerogel contact lens with an aqueous medium to form a polyurethane hydrogel contact lens.

A sixth aspect of the invention relates to a polyurethane hydrogel contact lens obtainable by the process described above.

A seventh aspect of the invention relates to a process for preparing a polyurethane xerogel in the form of a molded article, said process comprising the steps of:
(i) preparing a reaction mixture comprising at least one polyethylene glycol, at least one di-isocyanate and at least one diol of formula I

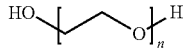

I wherein n is an integer from 1 to 25, preferably 2 to 10, more preferably 2 to 4;
(ii) reacting the reaction mixture formed in step (i) under substantially anhydrous conditions to form a polyurethane xerogel; and
(iii) injection molding the polyurethane xerogel to form a molded article.

An eighth aspect of the invention relates to a process for preparing a polyurethane hydrogel in the form of a molded article, said process comprising preparing a polyurethane xerogel in the form of a molded article as described above, and hydrating said molded article with an aqueous medium to form a polyurethane hydrogel.

A ninth aspect of the invention relates to an article of manufacture comprising a polyurethane xerogel or a polyurethane hydrogel as described above.

A tenth aspect of the invention relates to the use of a polyurethane xerogel or a polyurethane hydrogel as described above in the preparation of a contact lens.

DETAILED DESCRIPTION

Definitions

The "functionality" of a compound is used to refer to the number of functional groups that are capable of reacting in the reaction mixture. As such, the term diol is used to refer to a compound having two hydroxyl groups capable of reacting in the reaction mixture. The term "diisocyanate" is used to refer to a compound having two NCO groups capable of reacting in the reaction mixture.

"DK" is a measure of the oxygen permeability of a material provided in Barrer units where 1 Barrer=10-11 cm2·mL·mmHg.

The term "hydrogel" is used herein to refer to a polymer comprising 10 wt % or more water. A hydrogel in an aqueous medium will generally absorb water and retain its original dry shape but it will be enlarged. It will generally not dissolve in water to form a fluid solution unless it is significantly degraded.

The term "xerogel" is used to refer to a polymeric material which may form a hydrogel upon contact with sufficient water. Generally xerogel is dry and comprises less than 5 wt. % water.

The term "substantially anhydrous" and/or "dehydrated" is used herein to refer to conditions in which the amount of water is sufficiently low so as to produce a polyurethane backbone that is substantially free from urea groups. Preferably the amount of water in the reactant mixture is less than about 0.3 wt. %, more preferably less than about 0.1 wt. %, even more preferably less than about 0.05 wt. %.

Polymeric Material

The present invention relates to a polymeric material, in particular that is useful in the preparation of a contact lens. The polymeric material is generally in the form of a polyurethane xerogel or hydrogel that is suitable for use as a contact lens. The polymeric material is prepared by reacting a polyethylene glycol, a diol of formula I and at least one di-isocyanate under the conditions described above. The polymeric material is then processed by injection molding, compression molding, cast molding, spin cast molding or lathing into the shape of a lens.

Preferably, the polymeric materials of the invention are thermoplastic, i.e. the polymer softens and can flow when exposed to heat and/or pressure. The thermoplastic polymers described herein are ideal for use in the contact lens industry as they enable the cost effective manufacture of lenses on a large scale compared to processes which rely on reaction cast molding.

Moreover, the absence of water (as far as practically attainable) minimises the formation of urea groups in the polymer backbone, thereby giving rise to materials having lower, more desirable modulus values for the contact lens industry.

Advantageously, the compositions do not contain any secondary OH groups. The resulting polymers therefore exhibit high thermal stability and resistance to oxidative degradation. Preferably, the compositions are water insoluble.

Polyethylene Glycol

The present invention involves the use of at least one polyethylene glycol (PEG).

Preferably, the polyethylene glycol has a molecular weight of from about 500 to about 100,000, more preferably from about 1000 to about 50,000, even more preferably from about 3000 to about 10,000, more preferably still from about 5000 to about 8000.

In one highly preferred embodiment, the polyethylene glycol is PEG 6000. In another highly preferred embodiment, the PEG is selected from PEG 6088, PEG 3350 and PEG 1000.

Polyethylene glycols of varying molecular weights are commercially available and can be used to afford the polymeric materials of the present invention. Blends of two or more different molecular weight polyethylene glycols can also be used.

Preferably, the polyethylene glycol is used in an amount of from about 20 to about 80 wt % of the reactants, more preferably from about 30 to about 70 wt %, more preferably from about 35 to about 60 wt %, more preferably still, from about 40 to about 60 wt % of the reactants.

Diol

The polymer composition of the invention is prepared using at least one chain extender, which is a diol of formula I,

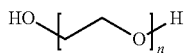

wherein n is an integer from 1 to 25, preferably 2 to 25, suitably 2 to 10, more suitably 2 to 4. Where n is 2 or more, the diol includes one or more ether groups. The presence of such ether groups increases the hydrophobicity of the resultant composition.

In one embodiment, the diol is ethylene glycol (EG), i.e. n is 1.

In one highly preferred embodiment, the diol is diethylene glycol (DEG), i.e. n is 2.

In one highly preferred embodiment, the diol is triethylene glycol (TEG), i,e, n is 3. Advantageously, compositions derived from TEG produce thermoformable polymers that show high light transmissibility in the fully water swollen state.

In one highly preferred embodiment, the diol is tetraethylene glycol (TTEG), i.e. n is 4.

Preferably, the diol is used an amount of from 5 to about 45 wt % of the reactants, more preferably from about 10 to about 25 wt % of the reactants.

Where the diol is EG, preferably it is used in an amount of from about 2 to about 10 wt % of the reactants, more preferably from about 2 to about 6 wt % of the reactants.

Where the diol is DEG, preferably it is used in an amount of from about 5 to about 20 wt % of the reactants, more preferably, from about 10 to about 16 wt % of the reactants.

Where the diol is TEG, preferably it is used in an amount of from about 8 to about 45 wt % of the reactants, more preferably from about 14 to about 30 wt of the reactants, even more preferably, from about 15 to about 25 wt % of the reactants.

Where the diol is TTEG, preferably it is used in an amount of from about 20 to about 30 wt % of the reactants.

The proportion of the diol within a given composition can also affect the material properties. The diol reacts with NCO groups (e.g., Desmodur W) to form the "hard" blocks within the resultant polymer matrix that affords the strength (tensile properties) to the material. The skilled person would thus appreciate that the proportion of the given diol can be adjusted in order to fine tune the tensile and other properties of the resulting material.

Preferably, the diol of formula I is used in an amount of about 2 to about 60 mole equivalents to the amount of PEG, preferably, from about 5 to about 30 mole equivalents, even more preferably, from about 15 to about 22 mole equivalents relative to the PEG in a given composition.

Di-isocyanate

The polymer composition of the invention is prepared using at least one di-isocyanate. Preferably, the di-isocyanate is an organic di-isocyanate. The di-isocyanate performs a number of different functions. Firstly, it acts as a coupling agent for the polyethylene glycol component to produce the soft segment. Secondly, it acts as a coupling agent for the diol component to produce urethane-rich hard segments. Thirdly, it acts as a coupling agent for the soft and hard segments to build up the molecular weight of the resulting polymer.

The diisocyanate is preferably an aliphatic diisocyanate. Aliphatic diisocynates which are fluid at ambient temperatures are particularly preferred, Preferably, the di-isocyanate is of the formula OCN—$R_1$—NCO, wherein $R_1$ is a linear or branched $C_3$-$C_{18}$-alkylene, an unsubstituted or $C_1$-$C_4$-alkyl-substituted or $C_1$-$C_4$-alkoxy-substituted $C_6$-$C_{10}$-arylene, a $C_7$-$C_{18}$-aralkylene, a $C_6$-$C_{10}$-arylene-$C_1$-$C_2$-alkylene-$C_6$-$C_{10}$-arylene, a $C_3$-$C_8$-cycloalkylene, a $C_3$-$C_8$-cycloalkylene-$C_1$-$C_6$-alkylene, a $C_3$-$C_8$-cycloalkylene-$C_1$-$C_6$-alkylene-$C_3$-$C_8$-cycloalkylene or a $C_1$-$C_6$-alkylene-$C_3$-$C_8$-cyclo-alkylene-$C_1$-$C_6$-alkylene.

Examples of particularly preferred diisocyanates include methylene dicyclohexyl diisocyanate, hexamethylene diisocyanate, isophorone diisocyanate, toluene-2,4-diisocyanate, toluene-2,6-diisocyanate, mixtures of toluene-2,4 and 2,6-diisocyanates, ethylene diisocyanate, ethylidene diisocyanate, propylene-1,2-diisocyanate, cyclohexylene-1,2-diisocyanate, cyclohexylene-1,4-diisocyanate, m-phenylene diisocyanate, 4,4"-biphenylene diisocyanate, 3,3"-dichloro-4,4"-biphenylene diisocyanate, 1,6-hexamethylene diisocyanate, 1,4-tetramethylene diisocyanate, 1,10-decamethylene diisocyanate, cumene-2,4-diisocyanate, 1,5-napthalene diisocyanate, 1,4-cyclohexylene diisocyanate, 2,5-fluorene-diisocyanate, polymeric 4,4'-diphenylmethane diisocyanate.

In one highly preferred embodiment, the di-isocyanate is Desmodur W (methylene bis(4-cyclohexyl isocyanate), MW=262.5).

Preferably, the di-isocyanate is used in an amount of from about 0.05 to about 55, more preferably from about 10 to about 40, more preferably, from about 20 to about 40 wt % of the reactants. The amount of di-isocyanate in any given composition can be adjusted to modify the relevant contact lens properties/attributes.

The stoichiometry (OH/NCO ratio) of the reaction mixture plays an important part in determining the properties of the resultant polymers, for example, the molecular weight/modulus of the material, is expected to be relatively higher for a 1:1 NCO:OH stoichiometry, and such a material is also expected to afford relatively lower water content on hydration than the polymer afforded by a composition that has a non stoichiometric ratio (e.g. OH groups>NCO groups). The skilled person would thus appreciate that the NCO:OH stoichiometry can be adjusted so as to obtain a material with the desired modulus and to some degree water content.

In one particularly preferred embodiment, the polyethylene glycol, the diol and the di-isocyanates are employed in such proportions as to provide an overall NCO/OH ratio of less than 1.2, preferably from 0.8 to about 1.1, more preferably from about 0.85 to about 0.99, more preferably from about 0.95 to about 0.98.

Preferably, the reaction takes place in the presence of a catalyst. Catalysts may be used to speed up the polymerization reaction and any of those catalysts normally used by those skilled in the art may be employed. For example, suitable catalysts include dibutyltin dilaurate, $FeCl_3$, stannous octoate, tertiary amines such as triethylamine and the like. In one highly preferred embodiment, the catalyst is dibutyl tin dilaurate (DBTDL).

Preferably, the catalyst is used in an amount of from about 0.01 wt % to about 2.0 wt %, or from about 0.01 wt % to about 1.0 wt % of the reactants, more preferably, from about 0.03 to about 0.8 wt %, even more preferably from about 0.05 wt % to about 0.5 wt %, more preferably still, from about 0.05 wt % to about 0.2 wt %, more preferably about 0.05 to about 0.1 wt % of the reactants. In one highly preferred embodiment, the catalyst is used in an amount of about 0.05 wt % of the reactants.

Preferably, the reaction mixture is in the form of a dry mixture, i.e. the mixture is substantially anhydrous and substantially excludes water. Preferably, the components of the reaction mixture are liquid at ambient temperature.

The reaction of the invention proceeds with the di-isocyanate reacting randomly with the PEG and diol to eventually form a thermoplastic polymer matrix/material. Advantageously, the resulting polymer matrix allows high flux of oxygen, resulting in a high DK lens.

Additional Components

In one preferred embodiment, the composition further comprises one or more antioxidants. Suitable antioxidants include BHA (butylated hydroxyl anisole), BHT (butylated hydroxytoluene) and ascorbic acid. Preferably, the antioxidant is BHA.

Preferably, the antioxidant is used in an amount of about 0.01 to about 10 wt % of the reactants, more preferably from about 0.1 to about 5 wt %, even more preferably from about 0.2 to about 1 wt % of the reactants in any given composition.

According to one embodiment of the present invention, the antioxidant is present at an amount of about 1.0 to about 3.0 wt % of the reactants.

In one preferred embodiment of the invention, the composition further comprises one or more additional components such as a modulus modifier, plasticizer, humectant, lubricant, process aid, viscosity reducer, compatibility enhancer and/or polymer matrix structure modifier. Preferably, the additional component is present in an amount of 0 to about 20 wt %, more preferably from about 2.5 to about 10 wt %, more preferably still, about 4 to about 6 wt % of the reactants.

Suitable modulus modifiers include components that alter the modulus property of the polyurethane and may also alter the oxygen permeability property. In one particularly preferred embodiment, the additional component is poly(ethylene glycol) dimethyl ether (PEG DME), which can act as a modulus modifier, plasticizer, humectant/lubricant, process aid, viscosity reducer, compatibility enhancer and polymer matrix structure modifier. PEG DMEs of various molecular weights (e.g. 250, 500, 1000, 2000) are commercially available and are suitable for use in the present invention. Preferably, for the purposes of the present invention, the PEG DME has a molecular weight of 1000 (e.g. PEG DME-1000). As an alternative, polyethylene glycol dibutyl ether can also be used.

Advantageously, the incorporation of PEG DME into the polymer compositions of the invention leads to lenses having a reduced modulus. Preferably, the modulus of lenses prepared from the polymer compositions of the invention is from about 0.1 to about 1.2 MPa, more preferably, about 0.3 to about 0.8 MPa even more preferably from about 0.4 to about 0.5 MPa.

In one preferred embodiment, the composition of the invention further comprises one or more tinting agents. By way of example, suitable tinting agents commonly used in the contact lens industry include the following: benzene sulfonic acid, 4-(4,5-dihydro-4-((2-methoxy-5-methyl-4-((2-(sulfooxy)ethyl)sulfonyl)phenyl)azo-3-methyl-5-oxo-1H-pyrazol-1-yl); [2-naphthalene-sulfonic acid, 7-(acetylamino)-4-hydroxyl-3-((4-((sulfo-oxyethyl)sulfonyl)phenyl)azo)-]; [5-((4,6-dichloro-1,3,5-triazin-2-yl)amino-4-hydroxy-3-((1-sulfo-2-naphthalenyl)azo-2,7-naphthalene-disulfonic acid, trisodium salt]; [copper, 29H, 31H-phthalocyaninato(2-)-$N_{29},N_{30},N_{31},N_{32}$)—, sulfo((4((2-sulfooxy)ethyl)sulfonyl)-phenyl)amino) sulfonyl derivative]; and [2,7-naphthalene-sulfonic acid, 4-amino-5-hydroxy-3,6-bis((4-((2-(sulfooxy)ethyl)sulfonyl)phenyl)azo)-tetrasodium salt].

Particularly preferred tinting agents for use in the present invention are phthalocyanine pigments such as phthalocyanine blue and phthalocyanine green, chromic-alumina-cobaltous oxide, chromium oxides, and various iron oxides for red, yellow, brown and black colours, chromophtal violet and chromophtal oxide green. The use of organic pigments, particularly phthalocyanine pigments, more particularly copper phthalocyanine pigments, and even more particularly copper phthalocyanine blue pigment (e.g., Colour Index Pigment Blue 15, Constitution No. 74160) is preferred. Opaquing agents such as titanium dioxide may also be incorporated. For certain applications, a mixture of colours may be employed for better simulation of natural iris appearance.

In one preferred embodiment, the tinting agent is a handling tint such as Reactive Blue 4.

Preferably, the weight percentage of the tinting agent is from about 0.0001% to about 0.08%, more preferably, 0.0001% to about 0.05%. In one preferred embodiment, the tinting agent is present in an amount of from about 0.005 to 0.08 wt %. In one preferred embodiment, the weight percentage of the tint is from about 0.0001% to about 0.04%, more preferably, from about 0.0001% to about 0.03 wt % of the reactants.

In one preferred embodiment, the composition of the invention further comprises one or more UV blockers or UV absorbers. A UV absorber may be, for example, a strong UV absorber that exhibits relatively high absorption values in the UV-A range of about 320-380 nanometers, but is relatively transparent above about 380 nm. Preferably, the UV Blocker is a commercially available UV Blocker such as AEHB (acryloxyethoxy hydroxybenzophenone; $C_{18}H_{16}O_5$).

Generally speaking, a UV absorber, if present, is provided in an amount from about 0.5 wt % to about 1.5 wt % of the reactants. Particularly preferred are compositions which include from about 0.6 wt % to about 1.0 wt % UV absorber, more preferably, about 1.0 wt % of the reactants.

The tinting agent and/or UV blockers can be charged into the lenses at the lens hydration stage post polymerisation after formation of the lenses by injection/compression moulding. Alternatively additives (eg tinting agents, UV blockers, and others) can be mixed with the molten polymer and extruded prior to pelletisation.

Process

Another aspect of the invention relates to a process for preparing a polyurethane xerogel contact lens, said process comprising:

(i) preparing a mixture comprising at least one polyethylene glycol, at least one di-isocyanate and at least one diol of formula I

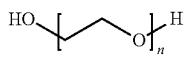

wherein n is an integer from 1 to 25, preferably 2 to 10, more preferably 2 to 4;
(ii) reacting the mixture formed in step (i) under substantially anhydrous conditions to form a polyurethane xerogel; and
(iii) processing the polyurethane xerogel to form contact lens.

Advantageously, the process of the invention involves reacting the reactants under substantially anhydrous conditions to form a polyurethane xerogel, without the addition of water as a reactant. This results in a polyurethane backbone that is substantially free from urea groups, in contrast to methods known in the art. The absence of water (as far as practicable) prevents any significant formation of urea groups which can cause an increase of the swollen water modulus to a degree that is undesirable for contact lenses.

As used herein the term "substantially anhydrous" refers to conditions in which the amount of water is sufficiently low so as to produce a polyurethane backbone that is substantially free from urea groups.

Preferably, the reaction takes place with as little water as is practically attainable. More preferably, the amount of water in the reaction mixture is less than about 0.3%, more preferably less than about 0.1%, even more preferably less than about 0.05% by weight of the reactants.

Processing step (iii) typically involves injection or compression molding the material into the shape of a lens. Other suitable processing techniques include cast molding, spin cast molding and lathing. Additionally, sheets of the polymeric material can be made and devices can be punched out. The sheets of the material can be made by compressing the thermoplastic material between two plates (eg Teflon plates) and also from the solution of the material in an organic solvent. In the later case the solvent would require to be evaporated.

A further aspect of the invention relates to a polyurethane xerogel obtainable by the above described process.

Another aspect of the invention relates to a process for preparing a polyurethane hydrogel, said process comprising preparing a polyurethane xerogel as described above, and hydrating said polyurethane xerogel with an aqueous medium to form a polyurethane hydrogel.

Yet another aspect of the invention relates to a polyurethane hydrogel obtainable by the process described above.

In one preferred embodiment, a catalyst is added to the reaction mixture. Suitable catalysts (together with guidance as to the appropriate amount) are as described above. In one highly preferred embodiment, the catalyst is dibutyl tin dilaurate (DBTDL).

Additional components, such as modulus modifiers, plasticizers, humectants, lubricants, process aids, viscosity reducers, tinting agents, compatibility enhancers and/or polymer matrix structure modifiers as described above, may also be present in the reaction mixture.

As mentioned above, the polymerisation reaction is carried out under substantially anhydrous conditions. Preferably, the reactants are dehydrated under vacuum to reduce the water content as far as possible. Preferably, the reactants (e.g. the diol component and the PEG component) are dehydrated under vacuum at elevated temperature using a rotary evaporator. More preferably, the reactants are dehydrated under vacuum at a temperature of at least 80° C., more preferably at least 95° C. Preferably, the reactants are dehydrated under vacuum at elevated temperature for at least 1 hour, more preferably, for at least 2 hours, even more preferably, for at least 4 hours or more. After this dehydration step, the moisture content of the reactants as measured by Karl Fisher is preferably <0.050%, more preferably, <0.035%. The timing and conditions associated with the dehydration process will depend upon the equipment used and the weight of material being dehydrated, generally more material will take longer to dehydrate. Optionally other methods e.g., freeze drying etc may also be employed to dehydrate.

In one preferred embodiment, the dehydrated diol (and optionally the antioxidant and/or plasticiser) is placed in a beaker in the oven and the dehydrated molten PEG is added thereto. Preferably, the required quantity of catalyst (e.g. dibutyl tin dilaurate) is then added to the mixture and the moisture content determined using Karl Fischer titration. Typically, the temperature is allowed to reach to about 73° C.$^+$-2° C. The beaker is then transferred into a fume hood the contents stirred thoroughly to give a homogenised mixture. The required quantity of the di-isocyanate (e.g. Desmodur W) is then added to the mixture and stirred until clear. The mixture is then typically dispensed into pre heated polypropylene tubs that are sealed with lids and reacted in an oven placed in a fume cupboard.

In one preferred embodiment, the reaction takes place at a temperature of from about 70° C. to about 120° C., more preferably, from about 80° C. to about 110° C. In one highly preferred embodiment, the reaction takes place at a temperature of from about 90° C. to about 100° C.

Preferably, the mixture is reacted for about 0.5 to about 24 hours, more preferably, for about 3 to about 12 hours. Even more preferably, the mixture is reacted for at least about 5 hours to about 12 hours, more preferably, for about 8 hours. The disappearance of the NCO absorption band at 2260 cm$^{-1}$ in the FTIR spectrum of the resulting product signifies that the reaction is complete.

The product is allowed to cool to ambient temperature and demolded, if required after chilling to a reduced temperature.

Preferably, the product is removed from the oven and allowed to cool to ambient temperature.

In one preferred embodiment, the product is cooled to a temperature of from about −30° C. to about −120° C. prior to removing the product from the mold.

Preferably, the product is chilled in a freezer. More preferably, still, the product is chilled to a temperature of from about −50° C. to about −90° C., even more preferably from about −60° C. to about −90° C. More preferably still, the product is chilled to a temperature of about −80° C. Preferably, the product is chilled for at least 20 minutes, more preferably, at least 60 minutes.

Advantageously, the cooling process allows the polymer chains to attain a temperature below the glass transition that shrinks the polymer matrix/material and reduces the interaction at the interface which enhances the demolding of the product. This also facilitates/eases the subsequent granulation of the material that produces granules suitable for feeding into an injection moulding machine.

Yet another aspect relates to the use of a polyurethane xerogel or polyurethane hydrogel according to the invention in the preparation of a contact lens.

Process for Preparing a Molded Article

Another aspect of the invention relates to a process for preparing a polyurethane xerogel in the form of a molded article, said process comprising the steps of:

(i) preparing a reaction mixture comprising at least one polyethylene glycol, at least one di-isocyanate and at least one diol of formula I

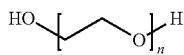

wherein n is an integer from 1 to 25, preferably 2 to 10, more preferably 2 to 4;

(ii) reacting the reaction mixture formed in step (i) under substantially anhydrous conditions to form a polyurethane xerogel; and (iii) injection molding the polyurethane xerogel to form a molded article.

In one preferred embodiment, the polyurethane xerogel formed in step (ii) is granulated or pelletized (typically by extruding and chopping to forms pellets suitable for injection moulding), and optionally dried under vacuum, prior to injection molding. The injection molding preferably takes place using conventional injection molding apparatus (such as a BOY 50M), that will be familiar to one of ordinary skill in the art.

A further aspect of the invention relates to a process for preparing a polyurethane hydrogel in the form of a molded article said process comprising preparing a polyurethane xerogel in the form of a molded article as described above, and hydrating said molded article with an aqueous medium to form a polyurethane hydrogel.

Article of Manufacture

Another aspect of the invention relates to an article of manufacture comprising a polymer as described above.

Preferably, the article of manufacture is in the form of a contact lens.

A contact lens must be permeable to oxygen in order for the lens to facilitate normal corneal metabolism. Preferably, contact lenses prepared using the polymer composition of the invention exhibit a DK value of a least 10 Barrers more preferably, at least 20, even more preferably, at least 30 Barrers. More preferably still, the lenses have a DK of at about 40 Barrers or more.

In one preferred embodiment, the lenses have a DK of about 15 to about 40 Barrers more preferably, from about 25 to about 40 Barrers.

A contact lens must be able to transmit light in the visible region in order to function effectively in correcting visual defects. Preferably, contact lenses prepared using the polymer composition of the invention exhibit a light transmissibility of at least 80%, more preferably at least 90%, even more preferably, at least 95% or 97%. Preferably, the light transmissibility is from about 90 to about 100%, more preferably from about 95 to about 100%, more preferably still, 100%.

Preferably, contact lenses prepared using the polymer composition of the invention exhibit a modulus of from about 0.1 to about 1.25 MPa, more preferably from about 0.25 to about 0.75 MPa.

The modulus of a contact lens plays a key role in controlling the mechanical properties of a soft contact lens. In addition, the on-eye performance is directly effected by the modulus. A value of greater than 1.25 MPa is likely to cause corneal staining whilst a modulus below 0.1 MPa is likely to lead to a lens with poor handling properties.

Preferably, contact lenses prepared using the polymer composition of the invention have a water content of 10 to about 90 weight %, more preferably, from about 20 to about 80 weight %, more preferably, from about 25 to about 75 weight %, even more preferably, from about 30 to about 70 weight %, more preferably still, from about 40 to about 70 weight %.

The equilibrium water content of the lens is a function of the material properties and plays a key role in determining the bulk, mechanical and physical properties of the lens. Water provides the medium to transmit oxygen and with the modulus governs the on eye properties/performance of the lens.

The present invention is further described with reference to the following non-limiting examples.

EXAMPLES

Method of Manufacture of PEG-IM polymer

Poly(ethylene glycol), PEG 6000 (Clariant) was dehydrated under vacuum at 95° C. for four hours and its number average molecular weight ($M_n$) was determined by end group analysis. The analysis afforded number average molecular weight, $M_n$=6088.

Similarly, the number average molecular weights were determined for the other polyethylene glycols used and referred here in the examples displayed in Tables 1-3 & 5.

Diethylene glycol (DEG), triethylene glycol (TEG), tetraethylene glycol (TTEG), and ethylene glycol (Aldrich) were checked for their moisture content by Karl Fisher and if the water content was <0.035% then these materials were considered to be substantially anhydrous and used without further dehydration, otherwise these were dehydrated under vacuum until the required low level of moisture is achieved, typically for a minimum of 2 hours at 95° C. using a rotary evaporator. PEG 3350($M_n$3350) ex Cariant was dehydrated for 4 hours at 95° C. under vacuum or until the low level of moisture content is achieved, typically <0.050%.

Procedure for Making a Larger Batch

The following manufacturing procedure was used for compositions 5, 9 (Table 1) compositions 11-15, 17-23 (Table 2). Compositions 12 and 13 (Table 2), additionally exemplify the use of mixture of two different molecular weight PEG materials. The following manufacturing procedure was also used for composition 1 in the Table 3.

1. Using a 2-place 5 kg Balance (Mettler Toledo) weigh out the required amount of substantially anhydrous or dehydrated and hot DEG, TEG, TTEG, as appropriate for a given composition and as indicated in the Tables 1-3 into a 5 liter glass beaker or Teflon beaker which is preheated in an oven at 95° C.
2. Add the required quantity of the BHA (as indicated in the Tables 1-3) into the same beaker. The BHA (butylated hydroxyl anisole; Sigma Aldrich) is weighed out in a small beaker using a 4-place analytical balance (AG 285 Mettler Toledo) and added into the 5 liter beaker by the difference in weight.
3. Place the beaker into an oven at 95° C. until the BHA dissolves.
4. Weigh out dehydrated molten PEG 6088 and/or PEG3350 into the 5 liter beaker as indicated in Tables 1-3 and mix the contents by carefully swirling. Replace the beaker into the oven at 95° C.
5. Using a syringe and needle add the required quantity of Dibutyl tin dilaurate, (DBTDL; Sigma Aldrich), into the beaker (the exact weight is taken by the difference in weight before and after the addition).

6. Carefully mix the contents and determine the moisture content of the mix using Karl Fischer titrator.
7. Check the temperature of the mix using a calibrated K type Welded Tip thermocouple (ex RS Components) and allow the temperature to reach to 73° C.+−2° C.
8. Transfer the beaker into a fume hood and using an overhead stirrer thoroughly mix the contents to a homogenised mixture.
9. Wear the respirator (Drager 3500 Xplore) fitted with A2P3 filters supplied by Suresafe.
10. Carefully and slowly (within 1-2 minute) add the required quantity of the Desmodur W (Bayer) into the beaker while the contents are being stirred.
11. Continue to stir the contents till the mixture becomes almost clear.
12. As quickly as possible dispense the mixture into polypropylene tubs that were pre heated. The tubs are sealed with lids and reacted for 8 hours at 95° C. preferably under nitrogen flow in an oven placed in a fume cupboard.
13. The product is allowed to cool to room temperature and demolded, if required after chilling to a reduced temperature.
14. The process is ameanable to scale up using automated standard machines (with some optimisation) commonly used by the polyurethane manufacturing industry.
15. The disappearance of NCO absorption band at 2260 cm$^{-1}$ in the FTIR spectrum of the resultant product assured complete reaction.
16. The product is subsequently pelletised/granulated using SG Granulator model SG-2427H (Shini Plastic Technologies Inc.). Alternatively the pellets can be made by melt extrusion and chopping the material. These pellets are optionally dried under vacuum prior to injection molding (for example, using a commercial Injection molding machine (BOY 50M) to injection mold female parts using a standard lens mold tool).

Procedure for Making a Smaller Batch

The following method was used to manufacture a smaller batch of the polymer such as compositions 1-4, 6-8 (Table 1) and compositions 1-10 (Table 2). These syntheses were carried out in a fume cupboard and wearing appropriate protective clothing, gloves, and a half mask respirator (Drager 3500 Xplore) fitted with A2P3 filters supplied by Suresafe.

Using an analytical balance the required amount of BHA and the dehydrated molten PEG as per indicated in the Tables 1-2 for a given composition are accurately weighed into a 100 ml polypropylene cup and sealed with the screwable lid. The cup is placed in an oven at 95° C. for few minutes until the BHA dissolves. Using a syringe and a fine needle, the required quantity of the catalyst (DBTDL) is added into the cup and stirred to mix the contents. The stirring can be achieved by an overhead stirrer or by the aid of a heated glass rod left in the cup. Finally the required amount of the Desmodur W is added to the cup through a syringe. The contents are mixed thoroughly and sealed with the lid. The cup is then placed in an oven at 95° C. for 8 hours to complete the reaction. The disappearance of the NCO absorption band at 2260 cm$^{-1}$ in the FTIR spectrum of the resultant product confirmed complete reaction.

For clarity of understanding, following description is offered for the composition 19 (Table 2).
PEG 6088: 1000.1 g=1000.1/6088=0.1643 moles;
TEG: 542.73 g=542.73/150.17=3.6141 moles, (therefore TEG content is 22× moles of PEG);
Desmodur: W 970.30 g=970.30/262.5=3.6964 moles;
NCO/OH=0.9783 disregarding any OH groups from BHA present in this composition which is likely to be insignificant.

In terms of mole ratios:
PEG 6088 (0.1643 moles), TEG (3.6141 moles) and Desmodur W (3.6964 moles) in presence of the antioxidant BHA (5.0264 g) and the catalyst DBTDL(1.2218 g) were mixed using an overhead stirrer and allowed to co-react by one shot random step growth polymerisation method and reacted for 8 hours in an oven at 95° C. The PEG and TEG were dehydrated under vacuum using a rotary evaporator to remove any moisture prior to use in the reaction. The individual steps of the manufacturing procedure are the same as described above under the methodology for preparing a larger batch.

The use of DEG in combination with PEG6088 in certain compositions produces polymers that display a "Tyndall effect" (i.e. a slight haze when observed vertically through the thickness of the hydrated polymer film) as indicated above. However, if the amount of DEG in the composition is lowered (e.g. Example 10) then the resultant polymer is transparent in hydrated state. Similarly if DEG is used in combination with PEG 3350 (e.g. Example 11), then useful polymers for contact lens applications can be produced. The same is true for EG (see Examples 12, 13).

All the polymer compositions of Table 1 extruded through Melt Flow Index within the temperature range 110-120° C., indicating the thermoplastic nature of the polymers.

For Table 2, all compositions extruded well through a Melt Flow Index apparatus at the temperature 110-130° C. with very little die swell, indicating the thermoplastic nature of these polymers. The hot extruded polymers were quite strong when assessed by stretching manually. These polymers in the hydrated state were also quite strong when assessed by stretching manually.

Compositions 22 and 23 were granulated and separately charged into a commercial injection molding machine (BOY 50M) to injection mold female parts using a standard lens mold tool. These molded parts were allowed to swell in saline. When fully hydrated the centre part of these moldings were punched cut and their refractive index and contact angles were measured. These are shown in Table 4.

Water Content

Water content is calculated after measurement of dry weight and hydrated weight of a lens by using the following equation:

$$\text{Water Content}(\%) = (W_{hydrated\ lens} - W_{dry\ lens})/W_{hydrated\ lens} \times 100$$

Five hydrated lenses, with excess surface water removed, are separately weighed on an analytical balance and average value is taken as $W_{dry\ lens}$. The lenses are then dried in an oven at 75° C. for 2 hours and weighed again separately. The average value is taken as $W_{dry\ lens}$.

% Transmittance

% Transmittance was determined under the guidance of ISO 8599 by using a double beam UV spectrophotometer (Jasco V530). A lens is placed into a cuvette containing standard saline solution. The cuvette is placed in the sample compartment. A matching cuvette containing saline is placed in the reference compartment of the UV spectrophotometer and a spectrum as percent transmittance was recorded between 200-780 nm. The test was repeated a further four times and the mean value (% transmittance) at 550 nm was recorded.

The contact lenses thus produced can be steam sterilised by a conventional method or may be sterilised by other methods including UV sterilisation technique.

DK Measurement

DK Measurement (i.e., oxygen permeability) was carried out by the polarographic technique as briefly described below:

Ten lenses were placed into the Gallenkamp incubator set at 35+/−0.5° C. for 24 hours. The centre thickness (CT) of each of the ten lenses were measured by Rehder ET-3 Electronic Thickness Gauge and these lenses were stacked as follows: A single lens stack, two lens stack, three lens stack, and four lens stack. The CT of each stack was measured three times and a mean value for each was calculated and fed into a spread sheet specifically developed for the method. Also recorded was the atmospheric pressure into the spread sheet. The stack of lenses were replaced into the incubator set at 35+/−0.5° C. and humidity>98%.

Each stack was separately placed on to the electrode (Rehder Permeometer with 8.7 mm electrode) ensuring that there are no bubbles entrapped between the lenses and the electrode. When the current reached its lowest point the reading was recorded in the relevant section of the spread sheet. This test was repeated for all the stacks.

The dark current reading (background) of the measurement system, when no oxygen is able to pass through to the electrode, was recorded and subtracted from all test material current values. Data was analysed taking into consideration the partial pressure of oxygen and the surface area of the polarographic sensor used and finally corrected for the edge effect. A graph of Dk/t corr verses thickness (cm) was then plotted and the inverse of the gradient of the best fit taken to represent the oxygen permeability (DK) of the lens material.

Modulus Data

Modulus data was measured for contact lenses prepared in accordance with the invention by tensile testing using the Instron 5842 Tensile testing system with Merlin Software.

Correlation to Standards/Regulation: ISO 9001:2008 (Quality Standards: Par 7.6; ISO 13485:2003 Medical Device Directive: Par 7.6; FDA Part 820 QS Regulation Subpart G: Control of inspection, monitoring and test equipment 820.72.

Sample Preparation

Thickness readings for each lens were obtained using the ET-3 Thickness gauge. The lenses were placed flat on the cutting mat and two long pieces were cut from around the centre of the flat lens using a razor blade. These cut pieces were put into saline solution in a sample dish. The sample was loaded on to clamps using tweezers carefully going for the top clamp first and then the bottom. The gap in between the clamps was set at 10 mm using a calibrated vernier caliper. Once set, the "Reset GL" button was pressed to set the Gauge Length". Once the sample was loaded, the balance load was set to 0.000N and the test was started using the console controls.

Contact Angle

The sessile drop contact angles were measured by an instrument (Model PGX, Serial 50104, Manufactured by FIBRO System AB, Sweden).

The contact lenses to be tested were prepared by extracting them in deionised water (DI water). Six lenses were placed into a jar containing at least 500 mls of deionised water (DI water). Each jar was then stored at around 25° C. for at least 16 hours. The DI water was then replaced and each jar was placed onto a roller unit for 2 hours. The lenses were then taken out of the jars and placed separately into labelled vials containing fresh DI water.

The hydrated and extracted lens was removed from the jar using silicone tipped tweezers. Excess water was removed by placing the lens front surface down onto a lint free tissue. The lens was then placed so that the convex surface was facing upwards, and a test sample was cut using the 4 mm cutter. The cut lens section was then placed face down on the lens wipe and the surface liquid was allowed to blot. The section was placed onto a microscope slide with front of the lens facing upwards and the section lying flat. The microscope slide was then placed underneath the PGX within the camera zone. "Pump" was pressed on the PGX, until a droplet emerged; this droplet then fell onto the surface of the cut lens strip. The software measured the contact angle as soon as the drop touched the surface. The test was repeated for all six lenses and mean value was calculated.

Tables 1 to 3 & 5 show examples of the presently claimed PEG-injection molded (PEG-IM) compositions.

The data for injection molded lenses from the composition IM92 of the invention is provided in Table 6.

Various modifications and variations of the described aspects of the invention will be apparent to those skilled in the art without departing from the scope and spirit of the invention. Although the invention has been described in connection with specific preferred embodiments, it should be understood that the invention as claimed should not be unduly limited to such specific embodiments. Indeed, various modifications of the described modes of carrying out the invention which are obvious to those skilled in the relevant fields are intended to be within the scope of the following claims.

TABLE 1

Selected PEG-injection molded compositions according to the Invention using diethyleneglycol (DEG) and Ethylene glycol (EG)

| Composition | Wt of PEG 6088 (g) | Wt of PEG 3350 (g) | Wt of DEG (g) | Wt of EG (g) | Weight of Desmodur w(g) | Weight of DBTDL(g) | Wt of BHA(g) | Visual appearance when hydrated | EWC (%) |
|---|---|---|---|---|---|---|---|---|---|
| 1 | 20.0448 | | 1.775 | | 5.611 | 0.59 | | | 80.3 |
| Wt % = | 71.53 | | 6.33 | | 20.02 | 2.1 | | | |
| Moles = | $3.292 \times 10^{-3}$ | | 0.0167 | | 0.0213 | | | | |
| 2 | 29.996 | | 4.1947 | | 11.0121 | 0.0137 | 0.0253 | tyndal effect | 84.07 |
| Wt % = | 66.30 | | 9.27 | | 24.34 | 0.03 | 0.056 | | |
| Moles = | $4.927 \times 10^{-3}$ | | 0.0395 | | 0.0419 | | | | |
| 3 | 30.053 | | 4.7162 | | 12.303 | 0.0170 | 0.0282 | tyndal effect | 80.6 |
| Wt % = | 63.78 | | 10.00 | | 26.11 | 0.036 | 0.06 | | |
| Moles = | $4.9364 \times 10^{-3}$ | | 0.0444 | | 0.0468 | | | | |
| 4 | 30.064 | | 4.9692 | | 12.949 | 0.0144 | 0.0289 | tyndal effect | 80.18 |
| Wt % = | 62.60 | | 10.34 | | 26.96 | 0.03 | 0.06 | | |
| Moles = | $4.9382 \times 10^{-3}$ | | 0.0468 | | 0.0493 | | | | |

TABLE 1-continued

Selected PEG-injection molded compositions according to the Invention using diethyleneglycol (DEG) and Ethylene glycol (EG)

| Composition | Wt of PEG 6088 (g) | Wt of PEG 3350 (g) | Wt of DEG (g) | Wt of EG (g) | Weight of Desmodur w(g) | Weight of DBTDL(g) | Wt of BHA(g) | Visual appearance when hydrated | EWC (%) |
|---|---|---|---|---|---|---|---|---|---|
| 5 | 1300.00 | | 226.62 | | 588.1 | 0.7673 | 2.1191 | tyndal effect | |
| Wt % = | 61.39 | | 10.70 | | 27.77 | 0.036 | 0.10 | | |
| Moles = | 0.2135 | | 2.1355 | | 2.2403 | | | | |
| 6 | 20.0900 | | 5.258 | | 13.394 | 0.01150 | | Semi opaque | 60.7 |
| Wt % = | 51.84 | | 13.56 | | 34.56 | 0.03 | | | |
| Moles = | 3.2999 × $10^{-3}$ | | 0.0495 | | 0.0510 | | | | |
| 7 | 35.69 | | 12.228 | | 31.107 | 0.129 | | v. opaque | 53.7 |
| Wt % = | 45.09 | | 15.45 | | 39.29 | 0.1629 | | | |
| Moles = | 5.8623 × $10^{-3}$ | | 0.1152 | | 0.1185 | | | | |
| 8 | | 30.5591 | 9.5243 | | 24.695 | 0.0330 | | Transparent &hard | 68.0 |
| Wt % = | | 47.15 | 14.69 | | 38.10 | 0.05 | | | |
| Moles = | | 9.1221 × $10^{-3}$ | 0.0897 | | 0.0940 | | | | |
| 9 | 975.23 | 325.58 | 255.77 | | 663.27 | 1.2073 | 2.2181 | Slight Tyndal effect | 77.12 |
| Wt % = | 43.86 | 14.64 | 11.5 | | 29.83 | 0.054 | 0.10 | | |
| Moles = | 0.1601 | 0.0971 | 2.4101 | | 2.5267 | | | | |
| 10 | 30.11 | | 2.6143 | | 8.039 | 0.0433 | | Transparent | |
| Wt % = | 73.78 | | 6.40 | | 19.70 | 0.10 | | | |
| Moles = | 4.9458 × $10^{-3}$ | | 0.0246 | | 0.0306 | | | | |
| 11 | | 30.33 | 4.7591 | | 14.136 | 0.0505 | | Transparent | |
| Wt % = | | 61.55 | 9.66 | | 28.68 | 0.10 | | | |
| Moles = | | 9.0537 × $10^{-3}$ | 0.0448 | | 0.0538 | | | | |
| 12 | 30.15 | | | 1.5241 | 7.798 | 0.0442 | | Tyndal effect | |
| Wt % = | 76.29 | | | 3.86 | 1.973 | 0.11 | | | |
| Moles = | 4.9523 × $10^{-3}$ | | | 0.0245 | 0.0297 | | | | |
| 13 | | 30.07 | 2.7783 | | 14.122 | 0.0483 | | Transparent | |
| Wt % = | | 63.95 | 5.91 | | 30.03 | 0.10 | | | |
| Moles = | | 8.9761 × $10^{-3}$ | 0.0447 | | 0.0538 | | | | |

TABLE 2

Examples of PEG-injection molded compositions using Triethyleneglycol (TEG)

| Compn | Wt of PEG 6088 (g) | Wt of PEG 3350 (g) | Wt of PEG 1000 (g) | Wt of TEG (g) | Weight of Desmodur w(g) | Weight of DBTDL (g) | Wt of BHA (g) | Visual appearance when hydrated | EWC (%) | Modulus (MPa) | UV transmission @550 nm (%) | DK (Barrers) |
|---|---|---|---|---|---|---|---|---|---|---|---|---|
| 1 | 40.033 | | | 4.9366 | 9.705 | 0.0208 | 0.1103 | transparent | | | | |
| Wt % | 73.04 | | | 9.00 | 17.71 | 0.038 | 0.20 | | | | | |
| Moles | 6.57 × $10^{-3}$ | | | 0.0328 | 0.0369 | | | | | | | |
| 2 | 30.062 | | | 7.4165 | 13.612 | 0.0273 | 0.0510 | transparent | 82.9 | | | |
| Wt % | 58.75 | | | 14.49 | 26.60 | 0.053 | 0.10 | | | | | |
| Moles | 4.937 × $10^{-3}$ | | | 0.0493 | 0.0518 | | | | | | | |
| 3 | 40.203 | | | 11.846 | 22.900 | 0.0378 | 0.144 | transparent | 69.5 | | | |
| Wt % | 53.51 | | | 15.77 | 30.48 | 0.050 | 0.192 | | | | | |
| Moles | 6.603 × $10^{-3}$ | | | 0.0789 | 0.0872 | | | | | | | |
| 4 | 40.311 | | | 13.822 | 25.250 | 0.0406 | 0.161 | transparent | 77.8 | 0.32 | | 46.0 |
| Wt % | 50.65 | | | 17.37 | 31.73 | 0.051 | 0.20 | | | | | |
| Moles | 6.621 × $10^{-3}$ | | | 0.0920 | 0.0961 | | | | | | | |
| 5 | 40.171 | | | 14.812 | 26.807 | 0.0411 | 0.161 | transparent | 77.0 | | | |
| Wt % | 48.99 | | | 18.06 | 32.69 | 0.050 | 0.196 | | | | | |
| Moles | 6.598 × $10^{-3}$ | | | 0.0986 | 0.1021 | | | | | | | |
| 6 | 40.189 | | | 16.780 | 30.189 | 0.0432 | 0.1103 | transparent | 69.0 | | >95 | |
| Wt % | 46.03 | | | 19.22 | 34.57 | 0.05 | 0.126 | | | | | |
| Moles | 6.60 × $10^{-3}$ | | | 0.1117 | 0.1150 | | | | | | | |

TABLE 2-continued

Examples of PEG-injection molded compositions using Triethyleneglycol (TEG)

| Compn | Wt of PEG 6088 (g) | Wt of PEG 3350 (g) | Wt of PEG 1000 (g) | Wt of TEG (g) | Weight of Desmodur w(g) | Weight of DBTDL (g) | Wt of BHA (g) | Visual appearance when hydrated | EWC (%) | Modulus (MPa) | UV transmission @550 nm (%) | DK (Barrers) |
|---|---|---|---|---|---|---|---|---|---|---|---|---|
| 7 | 40.158 | | | 17.7659 | 31.967 | 0.0458 | 0.1800 | transparent | 70.2 | 0.72 | | 39.4 |
| Wt % | 44.56 | | | 19.71 | 35.47 | 0.05 | 0.20 | | | | | |
| Moles | 6.596 × 10⁻³ | | | 0.1183 | 0.1217 | | | | | | | |
| 8 | 40.097 | | | 18.7525 | 33.636 | 0.0473 | 0.1852 | transparent | 59.3 | | | |
| Wt % | 43.24 | | | 20.22 | 36.28 | 0.05 | 0.20 | | | | | |
| Moles | 6.586 × 10⁻³ | | | 0.1248 | 0.1281 | | | | | | | |
| 9 | 40.173 | | | 19.741 | 35.501 | 0.0514 | 0.190 | transparent | 65.2 | | | |
| Wt % | 42.00 | | | 20.64 | 37.11 | 0.05 | 0.20 | | | | | |
| Moles | 6.598 × 10⁻³ | | | 0.1314 | 0.1352 | | | | | | | |
| 10 | 40.173 | | | 21.7316 | 38.822 | 0.0500 | 0.1997 | transparent | 68.9 | 1.05 | | 33.6 |
| Wt % | 39.78 | | | 21.52 | 38.44 | 0.05 | 0.20 | | | | | |
| Moles | 6.598 × 10⁻³ | | | 0.1447 | 0.1478 | | | | | | | |
| 11 | 1000.4 | | | 407.04 | 732.58 | 1.0503 | 4.2720 | transparent | 75.5 | 0.39 +/− 0.05 | | |
| Wt % | 46.63 | | | 18.97 | 34.15 | 0.049 | 0.20 | | | | | |
| Moles | 0.1643 | | | 2.7105 | 2.7907 | | | | | | | |
| 12 | 500.17 | 500.27 | | 445.51 | 806.55 | 1.1303 | 4.5099 | transparent | 72.6 | 0.58 | >95 | |
| Wt % | 22.15 | 22.15 | | 19.73 | 35.72 | 0.05 | 0.20 | | | | | |
| Moles | 0.0821 | 0.1493 | | 2.9667 | 3.0725 | | | | | | | |
| 13 | 500.00 | 500.00 | | 493.24 | 890.0190 | 1.19163 | 4.7665 | transparent | 73.1 | 0.44 +/− 0.03 | | |
| Wt % | 20.93 | 20.93 | | 20.64 | 37.25 | 0.05 | 0.20 | | | | | |
| Moles | 0.0821 | 0.1492 | | 3.2845 | 3.3905 | | | | | | | |
| 14 | 1000.1 | | | 382.34 | 697.14 | 1.0360 | 4.1475 | transparent | 72.5 | 0.64 +/− 0.07 | | |
| Wt % | 47.97 | | | 18.34 | 33.44 | 0.05 | 0.20 | | | | | |
| Moles | 0.1642 | | | 2.5460 | 2.6557 | | | | | | | |
| 15 | | 1000.3 | | 694.88 | 1254.24 | 1.4776 | 5.9222 | transparent | 63.8 | 1.78 +/− 0.18 | | |
| Wt % | | 33.83 | | 23.50 | 42.42 | 0.05 | 0.20 | | | | | |
| Moles | | 0.2985 | | 4.6272 | 4.7780 | | | | | | | |
| 16 | | | 250.12 | 375.42 | 689.35 | 0.6864 | 2.6272 | Opaque | 43 | | | |
| Wt % | | | 18.97 | 28.48 | 52.29 | 0.05 | 0.20 | | | | | |
| Moles | | | 0.2501 | 2.4999 | 2.6261 | | | | | | | |
| 17 | 1000.0 | | | 345.33 | 626.24 | 0.9841 | 3.9465 | transparent | 78.9 | 0.25 +/− 0.02 | | 46.1 |
| Wt % | 50.59 | | | 17.47 | 31.68 | 0.05 | 0.20 | | | | | |
| Moles | 0.1642 | | | 2.2995 | 2.3856 | | | | | | | |
| 18 | 1000.3 | | | 444.00 | 797.60 | 1.1809 | 4.5026 | transparent | 72.0 | 0.79 +/− 0.08 | | 39.4 |
| Wt % | 44.50 | | | 19.75 | 35.48 | 0.05 | 0.20 | | | | | |
| Moles | 0.1643 | | | 2.9566 | 3.0384 | | | | | | | |
| 19 | 1000.1 | | | 542.73 | 970.30 | 1.2218 | 5.0264 | transparent | 66.0 | 1.055 +/− 0.153 | | 33.6 |
| Wt % | 39.70 | | | 21.54 | 38.51 | 0.048 | 0.20 | | | | | |
| Moles | 0.1642 | | | 3.6141 | 3.6963 | | | | | | | |
| 20 | 500.17 | 500.27 | | 445.51 | 806.55 | 1.1303 | 4.5099 | transparent | | 0.58 +/− 0.04 | | |
| Wt % | 22.15 | 22.15 | | 19.72 | 35.72 | 0.05 | 0.20 | | | | | |
| Moles | 0.0821 | 0.1493 | | 2.9667 | 3.0725 | | | | | | | |
| 21 | 1000.30 | | | 419.35 | 754.08 | 1.1033 | 4.3599 | transparent | 74.1 | 0.63 +/− 0.04 | | |
| Wt % | 45.90 | | | 19.24 | 34.60 | 0.05 | 0.20 | | | | | |
| Moles | 0.1643 | | | 2.7925 | 2.8726 | | | | | | | |
| 22* | 1000.4 | | | 407.04 | 732.58 | 1.0503 | 4.2720 | transparent | 71.2 | 0.64 +/− 0.22 | | |
| Wt % | 46.63 | | | 18.97 | 34.15 | 0.049 | 0.20 | | | | | |
| Moles | 0.1643 | | | 2.7105 | 2.7908 | | | | | | | |
| 23* | 1000.3 | | | 419.34 | 755.20 | 1.0997 | 4.3409 | transparent | 69.4 | 0.81 +/− 0.14 | >95 | |

TABLE 2-continued

Examples of PEG-injection molded compositions using Triethyleneglycol (TEG)

| Compn | Wt of PEG 6088 (g) | Wt of PEG 3350 (g) | Wt of PEG 1000 (g) | Wt of TEG (g) | Weight of Desmodur w(g) | Weight of DBTDL (g) | Wt of BHA (g) | Visual appearance when hydrated | EWC (%) | Modulus (MPa) | UV transmission @550 nm (%) | DK (Barrers) |
|---|---|---|---|---|---|---|---|---|---|---|---|---|
| Wt % | 45.88 | | | 19.23 | 34.64 | 0.05 | 0.20 | | | | | |
| Moles | 0.1643 | | | 2.7924 | 2.8769 | | | | | | | |
| 24** | 999.74 | | | 542.70 | 974.8 | 1.2536 | 25.129 | transparent | 69.9 | 0.6 +/− 0.06 | | 34.25 |
| Wt% | 39.30 | | | 21.33 | 38.32 | 0.05 | 0.99 | | | | | |
| Moles | 0.1642 | | | 3.6139 | 3.7135 | | | | | | | |

**Composition 24 contains PEG-DME1000 (2 parts per hundred of the reactants) = 50.25 g in the composition24. This compound was added to the reactants prior to the polymerisation. i.e. prior to the addition of desmodur W.

TABLE 3

Examples for the PEG-injection molded composition based on Tetraethyleneglycol (TTEG)

| Composition | Wt of PEG6088 (g) | Wt of TEG (g) | Weight of Desmodur w (g) | Weight of DBTDL (g) | Wt of BHA(g) | Modulus (MPa) | Visual appearance of hydrated sample | ETB (mm) |
|---|---|---|---|---|---|---|---|---|
| 1 | 1000.0 | 494.51 | 689.9 | 1.0959 | 4.3740 | 0.09 +/− 0.02 | Transparent/ | 7.14 +/− 3.48 |
| Wt % | 45.66 | 22.58 | 31.50 | 0.05 | 0.20 | | | |
| Moles | 0.1642 | 3.3137 | 2.6281 | | | | | |

TABLE 4

Refractive index and contact angle for selected compositions of the invention

| | Refractive Index (mean) | Contact angle (mean) |
|---|---|---|
| Composition 22 | 1.3740 +/− 0.0006 | 22.5 +/− 6.4 |
| Composition 23 | 1.3750 +/− 0.0021 | 14.2 +/− 3.7 |

TABLE 5

Further examples of PEG Injection molded compositions using Triethylene glycol and different PEGs

| Composition | PEG8604 (g) | PEG5931 (g) | PEG3350 (g) | PEG1000 (g) | TEG (g) | Desmodur W (g) | BHA (g) |
|---|---|---|---|---|---|---|---|
| 1 | | | 50.00 | | 22.464 | 41.200 | 1.1381 |
| Wt % = | | | 42.69 | | 19.18 | 35.17 | 0.97 |
| Moles = | | | 0.0149 | | 0.1495 | 0.1569 | |
| 2 | | | 50.06 | | 33.638 | 60.728 | 1.4458 |
| Wt % = | | | 33.63 | | 22.60 | 40.80 | 0.97 |
| Moles = | | | 0.0149 | | 0.2239 | 0.2313 | |
| 3 | | | 50.02 | | 44.849 | 80.375 | 1.7561 |
| Wt % = | | | 27.50 | | 24.66 | 44.19 | 0.96 |
| Moles = | | | 0.0149 | | 0.2986 | 0.3062 | |
| 4 | | | 50.125 | | 50.000 | 88.217 | 1.3740 |
| Wt % = | | | 26.03 | | 25.96 | 45.81 | 0.71 |
| Moles = | | | | | | | |
| 5 | | | 50.02 | | 67.254 | 119.542 | 2.3677 |
| Wt % = | | | 20.49 | | 27.55 | 48.97 | 0.97 |
| Moles = | | | | | | | |
| 6 | | | 30.009 | | 20.1827 | 36.512 | 0.8661 |
| Wt % = | | | 33.58 | | 22.58 | 40.85 | 0.97 |
| Moles = | | | 0.0089 | | 0.1343 | 0.1391 | |
| 7 | | 20.000 | 20.032 | | 21.839 | 39.361 | 1.003 |
| Wt % = | | 19.17 | 19.20 | | 20.93 | 37.73 | 0.96 |
| Moles = | | 0.0033 | 0.0059 | | 0.145 | 0.1499 | |
| 8 | | 15.033 | 15.011 | | 21.393 | 37.821 | 0.891 |
| Wt % = | | 16.33 | 16.31 | | 23.25 | 41.09 | 0.97 |
| Moles = | | 0.0025 | 0.0045 | | 0.1424 | 0.1440 | |
| 9 | 20.000 | | 20.009 | | 19.314 | 35.536 | 0.9466 |
| Wt % = | 20.46 | | 20.46 | | 19.76 | 36.35 | 0.97 |
| Moles = | 0.0023 | | 0.0059 | | 0.1286 | 0.1354 | |

TABLE 5-continued

Further examples of PEG Injection molded compositions using Triethylene glycol and different PEGs

| | | | | | | | |
|---|---|---|---|---|---|---|---|
| 10 | 15.025 | | 20.016 | | 17.970 | 32.548 | 0.8525 |
| Wt % = | 17.04 | | 22.70 | | 20.38 | 36.92 | 0.97 |
| Moles = | 0.0017 | | 0.0059 | | 0.1196 | 0.1406 | |
| 11 | | 500.30 | 500.32 | | 701.39 | 1256.63 | 29.5813 |
| Wt % = | | 16.41 | 16.41 | | 23.00 | 41.21 | 0.97 |
| Moles = | | 0.0843 | 0.1493 | | 4.6700 | 0.1569 | |
| 12 | 40.116 | | | 4.6624 | 21.6532 | 38.498 | 1.0424 |
| Wt % = | 36.40 | | | 4.23 | 19.64 | 34.93 | 0.94 |
| Moles = | 0.0046 | | | 0.0046 | 0.1442 | 0.1466 | |
| 13 | | 1200.50 | | | 668.62 | 1195.34 | 30.6367 |
| Wt % = | | 38.01 | | | 21.17 | 37.85 | 0.97 |
| Moles = | | 0.2024 | | | 4.4524 | 4.5536 | |

| Composition | DBTDL (g) | PEG dme 1000 | PEG dme 250 (g) | EWC (%) | Visual appearance when hydrated | Ocutec Ref. |
|---|---|---|---|---|---|---|
| 1 | 0.0573 | 2.2648 | | 72.7 | Transparent | IMA-14 |
| Wt % = | 0.049 | 1.93 | | | | |
| Moles = | | | | | | |
| 2 | 0.0733 | 2.8972 | | 63.7 | Transparent | IMA-15 |
| Wt % = | 0.05 | 1.95 | | | | |
| Moles = | | | | | | |
| 3 | 0.0897 | 4.7740 | | 55.9 | Transparent | IMA-16 |
| Wt % = | | 2.62 | | | | |
| Moles = | | | | | | |
| 4 | 0.0724 | 2.7924 | | 56.2 | Transparent | IMA-17 |
| Wt % = | 0.04 | 1.45 | | | | |
| Moles = | | | | | | |
| 5 | 0.1160 | 4.8127 | | 43.9 | Transparent | IMA-18 |
| Wt % = | 0.05 | 1.97 | | | | |
| Moles = | | | | | | |
| 6 | 0.0432 | 1.7512 | | 60.2 | Transparent | IMA-33 |
| Wt % = | 0.05 | 1.96 | | | | |
| Moles = | | | | | | |
| 7 | 0.0591 | 2.032 | | 60.2 | Transparent | IMA35 |
| Wt % = | 0.05 | 1.95 | | | | |
| Moles = | | | | | | |
| 8 | 0.0461 | 1.830 | | 64.4 | Transparent | IMA-36 |
| Wt % = | 0.05 | 1.99 | | | | |
| Moles = | | | | | | |
| 9 | 0.0491 | 1.9000 | | 63.4 | Transparent | IMA-37 |
| Wt % = | 0.05 | 1.94 | | | | |
| Moles = | | | | | | |
| 10 | 0.0488 | 1.7050 | | 60.9 | Transparent | IMA-38 |
| Wt % = | 0.05 | 1.93 | | | | |
| Moles = | | | | | | |
| 11 | 1.4378 | 59.1910 | 59.3449 | 62.1 | Transparent | IMA-41 |
| Wt % = | 0.05 | 1.94 | 1.95 | | | |
| Moles = | | | | | | |
| 12 | 0.0534 | 4.1816 | | 67.5 | Opaque | IMA-43 |
| Wt % = | 0.05 | 3.79 | | | | |
| Moles = | | | | | | |
| 13 | 1.5533 | 61.2669 | | 66.3 | Transparent | IM-92 |
| Wt % = | 0.05 | 1.94 | | | | |
| Moles = | | | | | | |

TABLE 6

Data for Injection molded lenses from the composition 13 (in Table 5) of the invention

| Transmission at 550 nm (Mean) % | Modulus (Mean) MPa | DK Barrer | EWC (mean) % | Contact Angle (mean) Degree | Tear Strength (mean) g/mm | Diameter (mean) mm | Centre thickness (mean) micron | Power Dioptre | Base curve mm |
|---|---|---|---|---|---|---|---|---|---|
| 96.94 | 1.2 | 29.6 | 68.3 | 43.9 | 14.4 | 14.6 | 87 | 2.75 | 8.9 |

Centre Thickness was measured by Rehder Electronic Thickness Gauge
Base Curve & Diameter was measured by Optimec
Power was measured by Focimeter

The invention claimed is:

1. A process for preparing a contact lens, said process comprising the steps of:
   (i) preparing a reaction mixture comprising at least one polyethylene glycol, at least one di-isocyanate, at least one diol of formula I

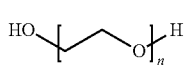

wherein n is an integer from 3 to 25,
   and less than 0.1 wt % water,
   wherein the mixture has an overall NCO/OH ratio of less than 1.2;
   (ii) reacting the reaction mixture formed in step (i) under substantially anhydrous conditions to form a polyurethane xerogel;
   (iii) granulating the polyurethane xerogel; and
   (iv) injection molding the polyurethane xerogel to form a contact lens.

2. The process according to claim 1 wherein following formation of the contact lens, the mold is cooled to a temperature of from about −30° C. to about −120° C. prior to removal of the contact lens from the mold.

3. A process for preparing a polyurethane hydrogel in the form of a contact lens, said process comprising preparing a polyurethane xerogel in the form of a contact lens according to claim 1, and hydrating said contact lens with an aqueous medium to form a hydrated polyurethane hydrogel contact lens.

* * * * *